United States Patent [19]

Keller

[11] Patent Number: 5,261,575
[45] Date of Patent: Nov. 16, 1993

[54] DISPENSER FOR PULVERULENT OR GRANULAR MATERIALS

[75] Inventor: Peter Keller, Juchen-Gierach, Fed. Rep. of Germany

[73] Assignee: Effem GmbH, Verden/Aller, Fed. Rep. of Germany

[21] Appl. No.: 920,455

[22] PCT Filed: Dec. 20, 1991

[86] PCT No.: PCT/DE91/01009

§ 371 Date: Oct. 22, 1992

§ 102(e) Date: Oct. 22, 1992

[30] Foreign Application Priority Data

Dec. 22, 1990 [DE] Fed. Rep. of Germany ... 9017370[U]

[51] Int. Cl.⁵ .............................................. G01F 11/26
[52] U.S. Cl. ...................................... 222/455; 222/546
[58] Field of Search ............... 222/454, 456, 545, 546, 222/557, 455

[56] References Cited

U.S. PATENT DOCUMENTS

| | | |
|---|---|---|
| 2,800,257 | 7/1957 | Nixon . |
| 2,853,213 | 9/1958 | Buehlig . |
| 3,185,357 | 5/1965 | Merkel . |
| 4,144,989 | 3/1979 | Joy ..................... 222/456 X |
| 4,151,934 | 5/1979 | Saeki . |
| 4,170,318 | 10/1979 | Saeki et al. . |
| 4,463,882 | 8/1984 | Hammett ............... 222/546 X |
| 5,078,305 | 1/1992 | Glynn et al. .......... 222/456 X |

Primary Examiner—Gregory L. Huson
Attorney, Agent, or Firm—Curtis, Morris & Safford

[57] ABSTRACT

A dispenser for, in particular, pulverulent or granular materials, have a storage chamber, a portioning chamber and a discharge chamber having a discharge opening. The discharge chamber is separated from the portioning chamber by a partition, in which, by a first tilting over, the material passes into the portioning chamber and from there, on tilting back, passes into the discharge chamber and, on a second tilting over, the portioned material is discharged. The dispenses also includes, as well as with a closure, which in the closed state closes both a through opening from the storage chamber to the portioning chamber, as well as the discharge opening.

10 Claims, 18 Drawing Sheets

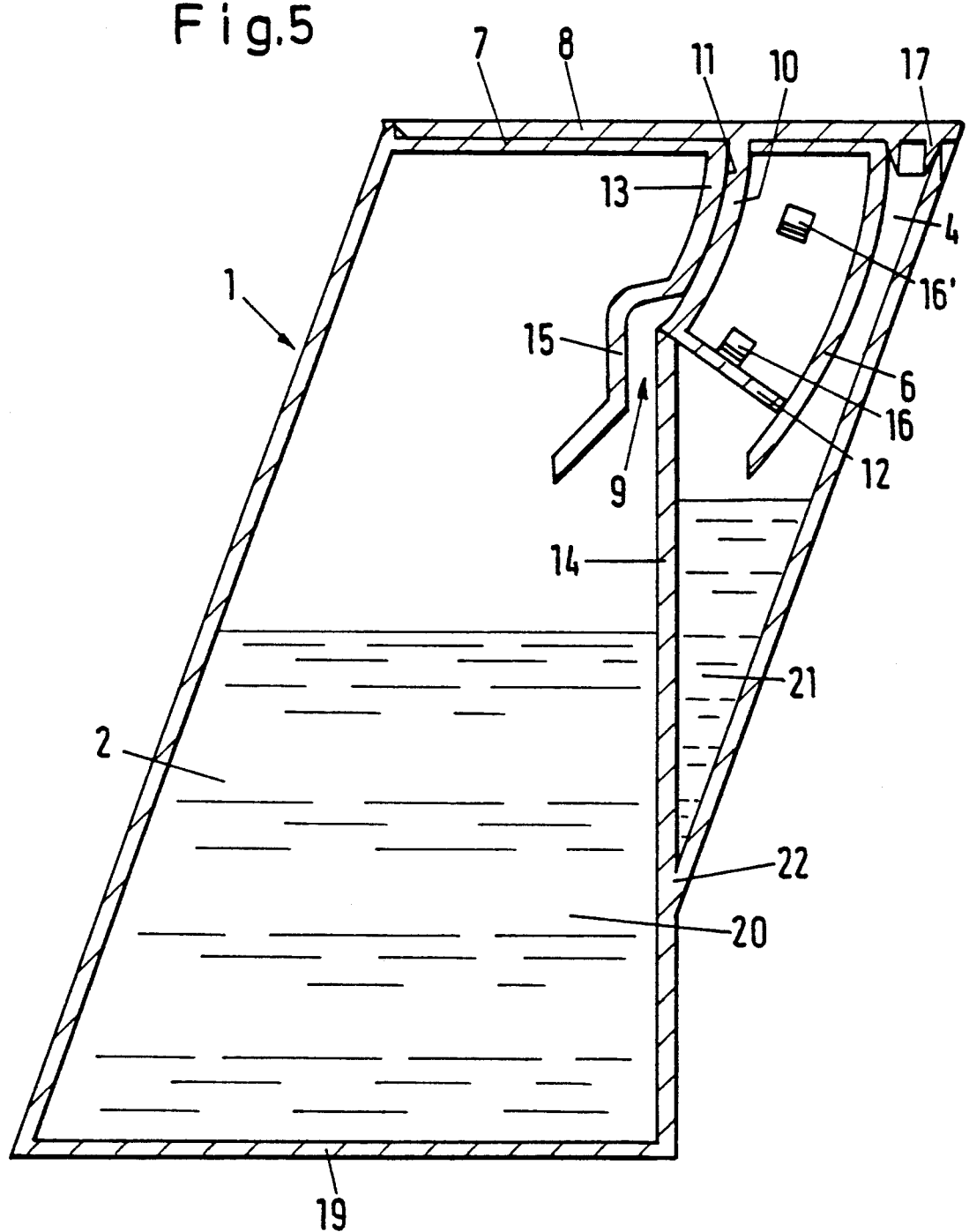

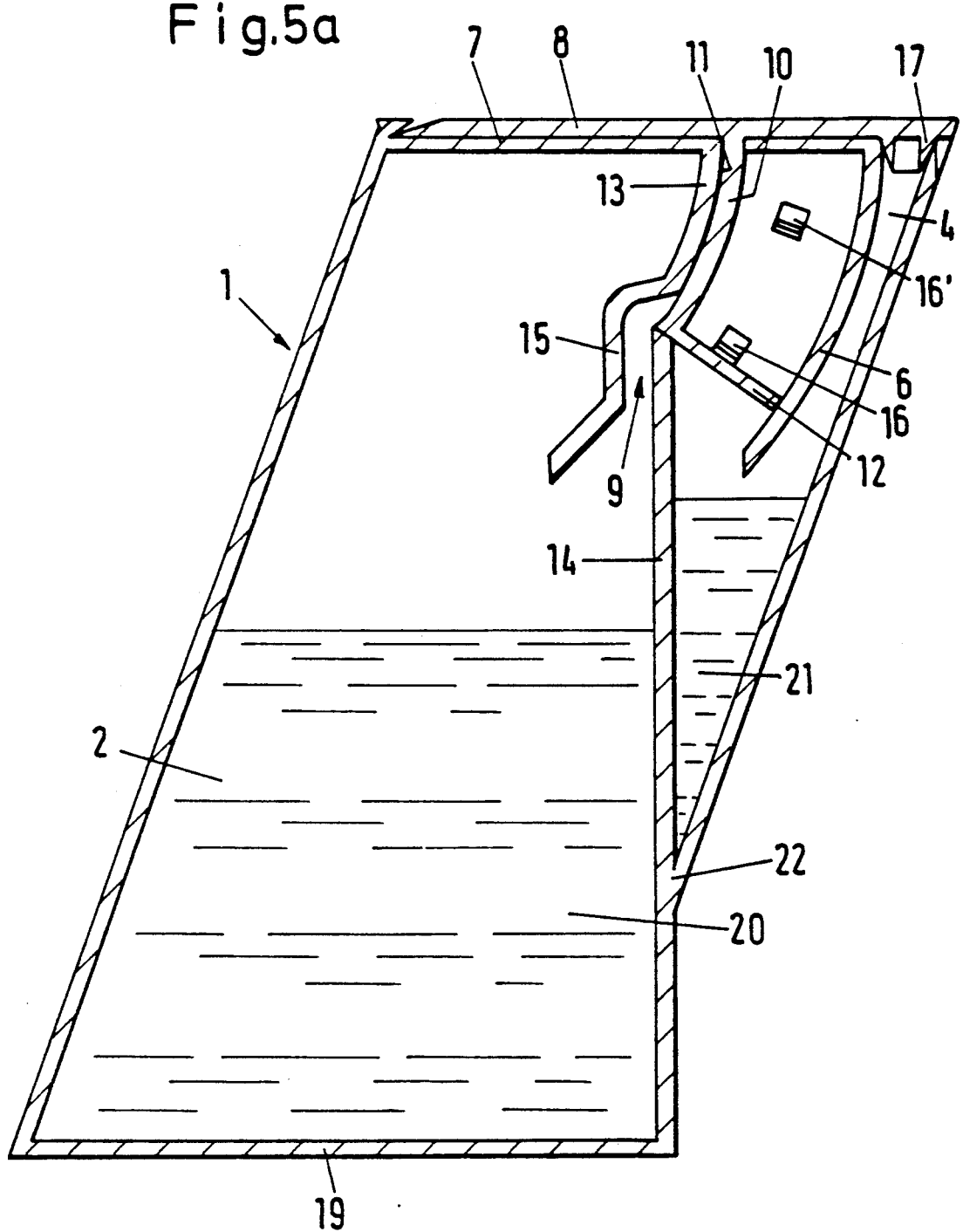

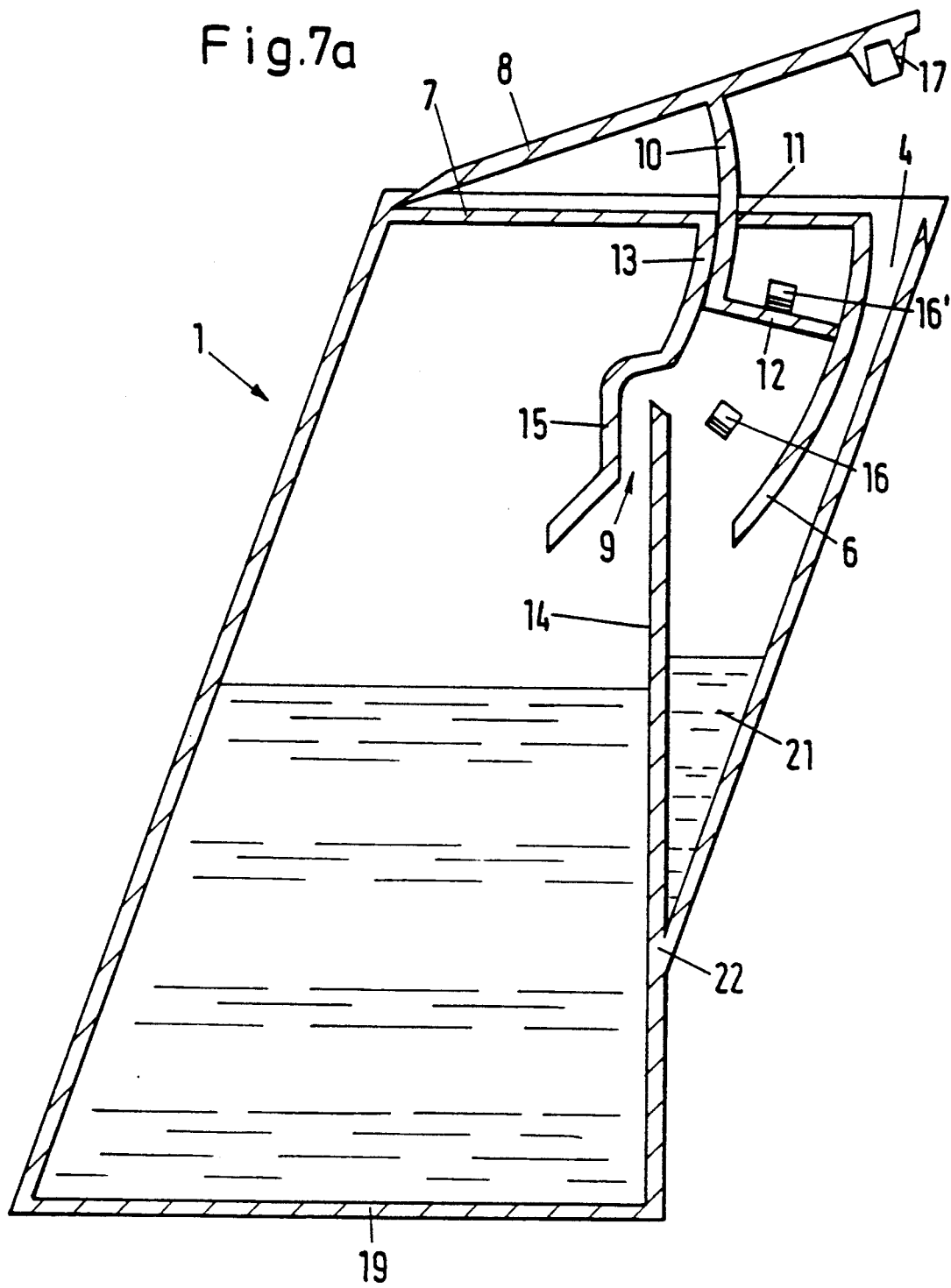

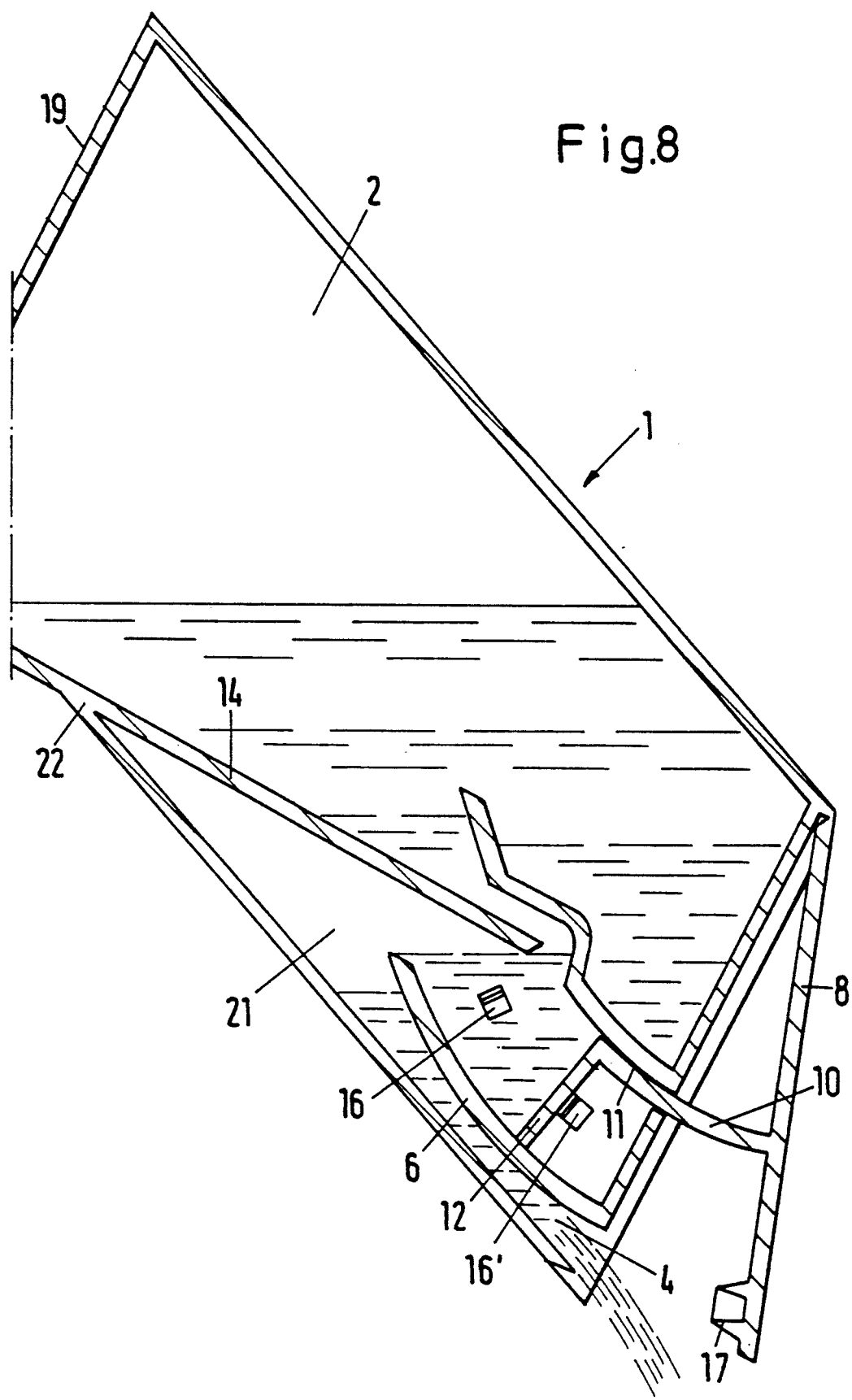

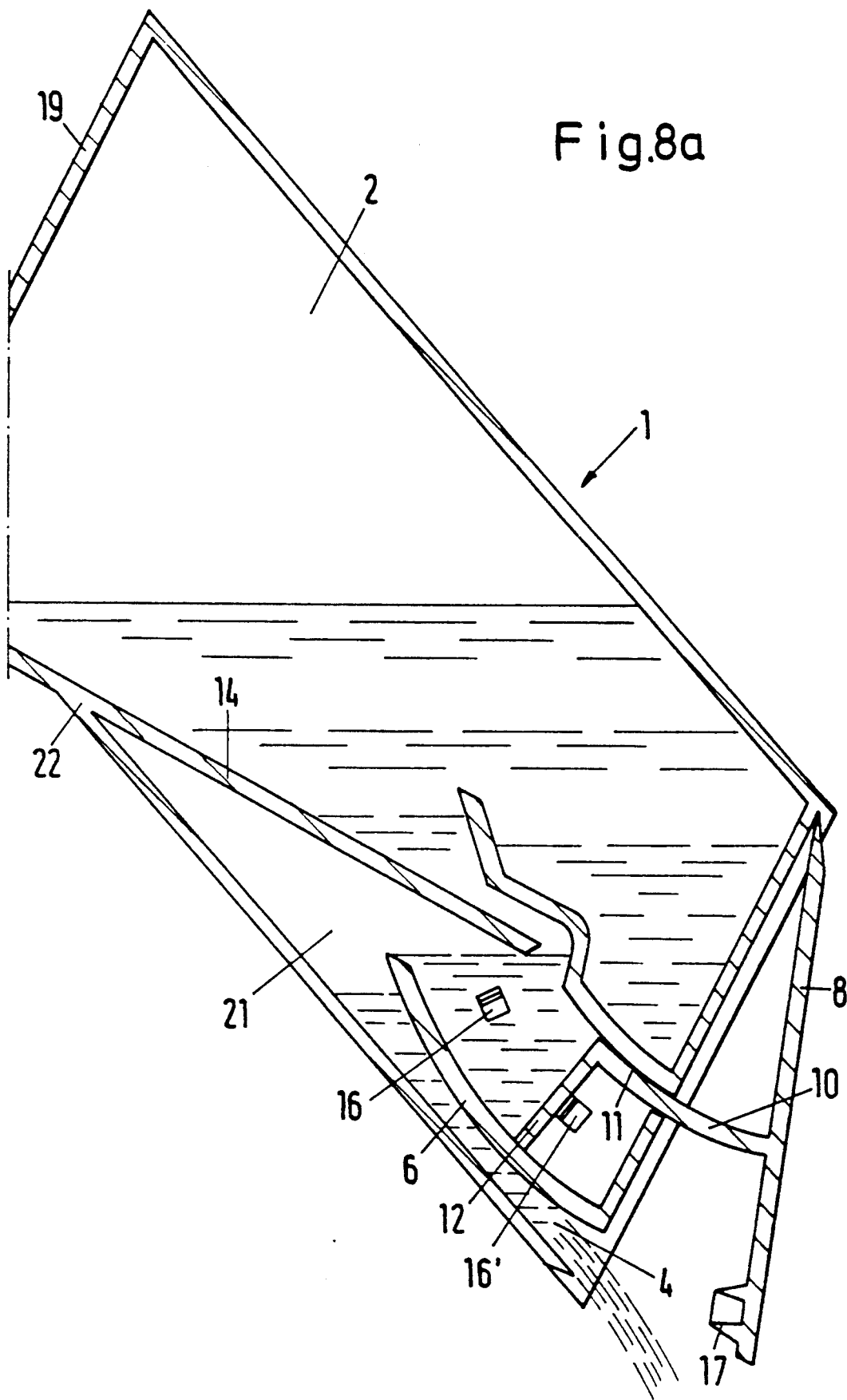

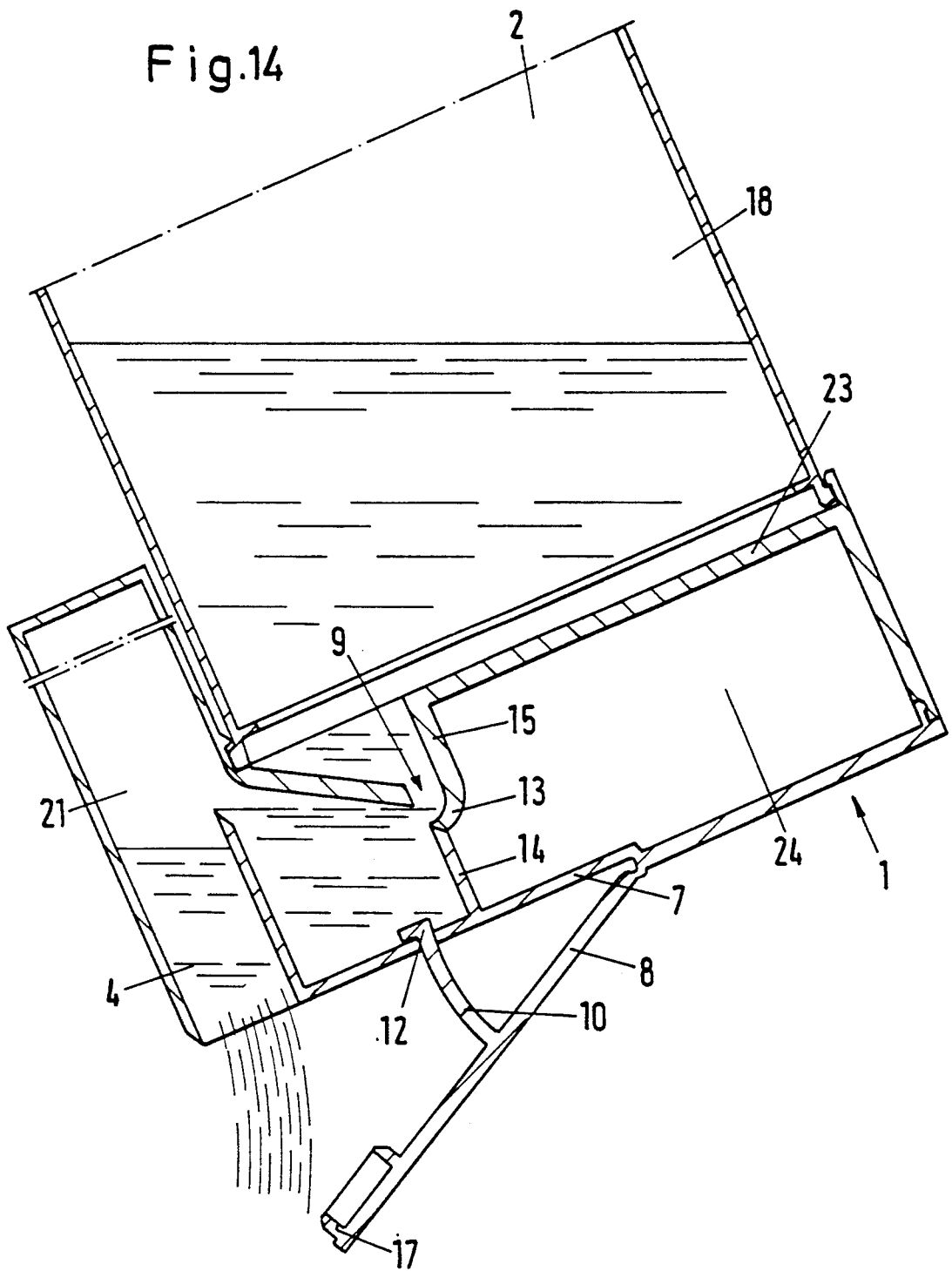

DISPENSER FOR PULVERULENT OR GRANULAR MATERIALS

FIELD OF THE INVENTION

The present invention relates to dispensers for, in particular, pulverulent or granular materials.

BACKGROUND OF THE INVENTION

Numerous different constructions of such dispensers are already known and reference is e.g. made to DE-OS 2,735,372. Dispensers are generally used for bringing about a portioned discharge or delivery. They can be used both for materials and for liquids. However, a continuous pouring out or emptying is not possible and instead a discharge can only be achieved as a result of alternate tipping or tilting.

In a dispenser known from the aforementioned document (of. FIG. 42) the partition is shaped on the closure between the discharge chamber and the portioning chamber. In the closed state one face of the partition engages on a dividing wall between the portioning chamber and the storage chamber from the side of the portioning chamber. Simultaneously the closure closes the through opening from the storage chamber to the portioning chamber by a lid-like engagement on the horizontally constructed through opening. On opening the closure the shaped partition is bent aside from the dividing wall between the storage chamber and the portioning chamber. Simultaneously there is a resulting change to the geometry of the portioning chamber and the discharge chamber, because the partition separates said two chambers. As a function of the opening position of the closure, the portioning chamber is larger or smaller. The lid-like engagement of the closure on the through opening from the storage chamber to the portioning chamber also leads to a different degree of opening as a function of the position of the closure. With, In particular, with granular media, the media can be deposited between the parts moved along one another and can consequently lead to frictional or wear action and consequently to leaks. The partition between the portioning chamber and the discharge chamber, in the closed state, not only engages frontally on the dividing wall between the storage chamber and the portioning chamber on the side of the latter, but its lateral faces must, in order to achieve the necessary separation between the portioning chamber and the discharge chamber, be guided on lateral boundary wells of the portioning chamber or discharge chamber. In view of the tolerances with e.g. occur in the case of plastic injection mouldings and the fine grains, which are almost always present to a varying degree even in the case of coarser grain media, such media can penetrate between the parts moved along one another. As a result the use characteristics are disadvatageously influenced.

OBJECT OF THE INVENTION

On the basis of the aforementioned prior art the problem of the present invention is to provide a dispenser for, in particular, pulverulent or granular materials, which can be easily manufactured and is more favourable to handle.

The problem is solved by the characterizing features of claim 1.

SUMMARY OF THE INVENTION

According to the invention the partition is constructed in fixed manner and on the closure is constructed a blocking or shutting part for blocking or shutting the through opening from the storage chamber to the portioning chamber in the closed state, said blocking part being introduceable into the portioning chamber during a closing movement of the closure. Thus, according to the invention the boundary walls of the chambers are fixed. There is no change to the chamber geometry by opening or closing the closure. The blocking part is moved through one of the chambers, namely the portioning chamber, in order to cover or close in the closed state the through opening between the storage and portioning chambers. As a result of the fixed construction of the partition and also the dividing wall between the storage and portioning chambers, no material or granular matter can be deposited between the lateral edges of the dividing wall or partition and the associated surrounding walls. A much better seal can also be obtained in conjunction with a use with liquids. The blocking part can be constructed in such a way that it is inserted in the portioning chamber at a distance from the lateral boundary walls and possibly also at a distance from the partition or dividing wall. With respect to the blocking of the through opening there can be a substantially frontal engagement on an opening edge or rim of said opening. This also makes it possible to obtain a high closure seal and a limited frictional or wear action. The through opening need not necessarily pass laterally up to the lateral boundary walls. According to the invention the blocking part is guided by a portion of the dividing wall. This is an alternative embodiment to a completely free passage of the blocking part through the opening in a cover of the portioning chamber. However, the dividing wall portion guiding the blocking part can also engage on said blocking part at a distance from a cover of the portioning chamber. In this connection the invention also proposes that the blocking part, in the vicinity of the opening in the cover of the portioning chamber, is laterally spaced from the dividing wall and/or partition and can optionally also be laterally spaced from the lateral boundary walls. It is also possible for the blocking part in the closed state to close an internal cross-section of the portioning chamber, i.e. reduces the size of the latter in the closed state. The blocking part is preferably displaceable in a locking manner, so that the blocking part and the connected closure can be adjusted in different positions. Preferably, the closure with the shaped on blocking part tends, on opening the closure, to pass into a clearly defined open position, so that always a free tipping or pouring out is possible. From the moulding standpoint this can be achieved in that the closure shaped onto the chambers is gated in the open state. On closing the closure correspondingly a pretension is built up in said closure, which attempts to move it into the open position. A one-piece construction of the closure cover with the chambers is particularly advantageous for this purpose.

According to a further development, the invention proposes that, projecting into the storage chamber is formed a guide wall opening counter to a pouring direction and which creates a funnel-shaped narrowing towards the through opening. On a first tilting of the dispenser the material or liquid is passed through the guide wall to the through opening and flows through the latter into the portioning chamber. In preferred manner, the guide wall is constructed in such a way that on projecting in the pouring direction said guide wall only covers part of the cover surface of the storage chamber. Thus, during a tilting process the entire supply does not act on the material flowing through the through opening into the portioning chamber. However, since as the guide wall covers the dividing wall and, since a clearly defined pouring position of the dispenser is indicated through the discharge opening, a complete discharge of e.g. granular material is easily achieved.

The dispenser in the above-described form can be shaped as a top onto a storage container, bottle, etc. or can be inseparably joined thereto. However, preferably the dispenser is constructed as an attachment for a storage container and can e.g. be connected thereto by a clip or screw connection. Thus, the storage chamber is largely or entirely formed by the storage container.

BRIEF DESCRIPTION OF THE DRAWINGS

The invention is described in greater detail hereinafter relative to non-limitative embodiments and with reference to the attached drawings, wherein:

FIG. 5 depicts a closed dispenser according to another embodiment.

FIG. 7a depicts a representation according to FIG. 7 with a closure constructed as a separate part.

FIG. 8 depicts the dispenser according to FIG. 5, open, according to FIG. 7 and in a discharge position.

FIG. 8a depicts a representation according to FIG. 8 with a closure manufactured as a separate part.

FIG. 14 depicts the dispenser of FIG. 11 in the discharge position.

DETAILED DESCRIPTION

Figure 1:
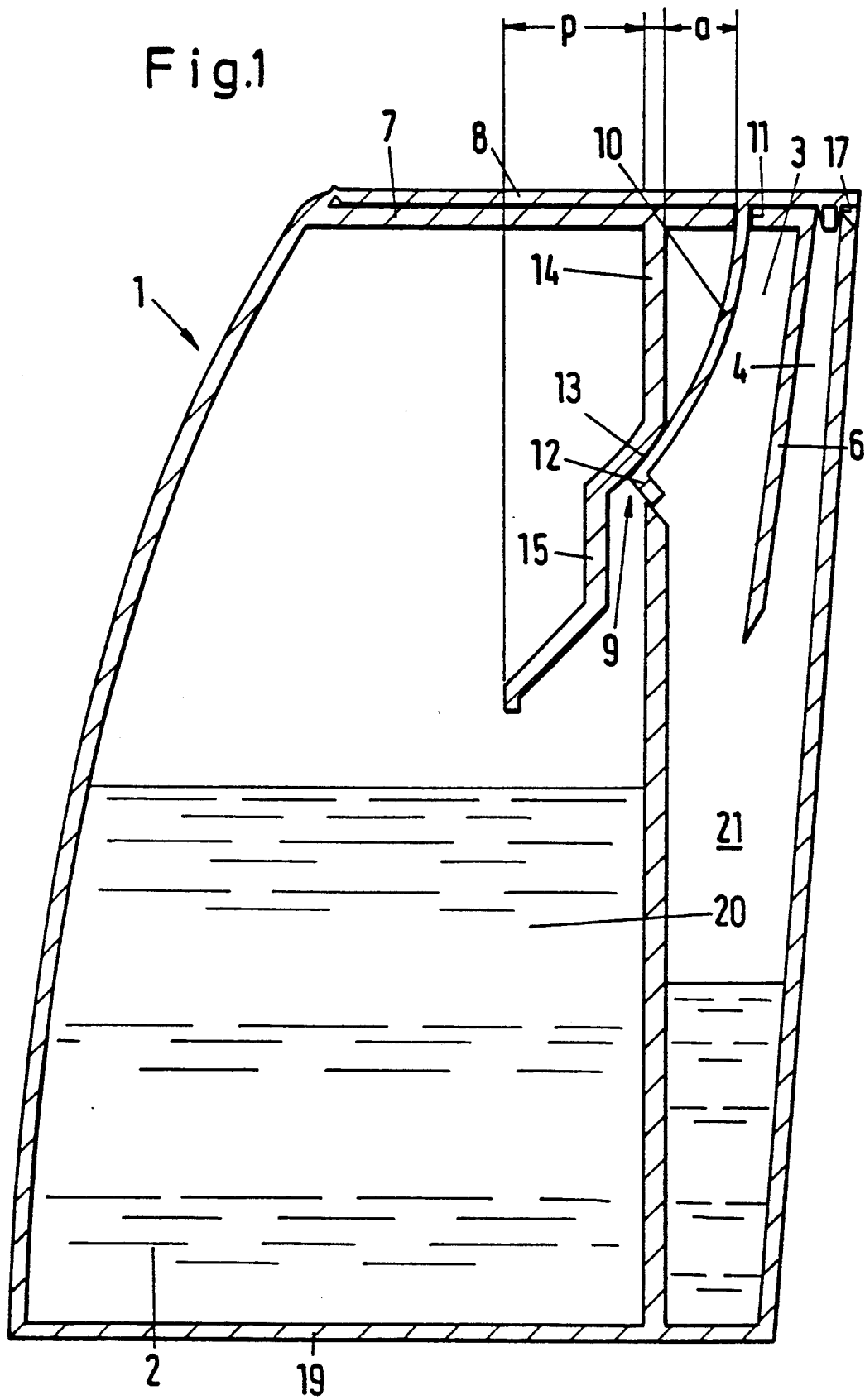
FIG. 1 depicts a closed dispenser according to a first embodiment.
Figure 3:
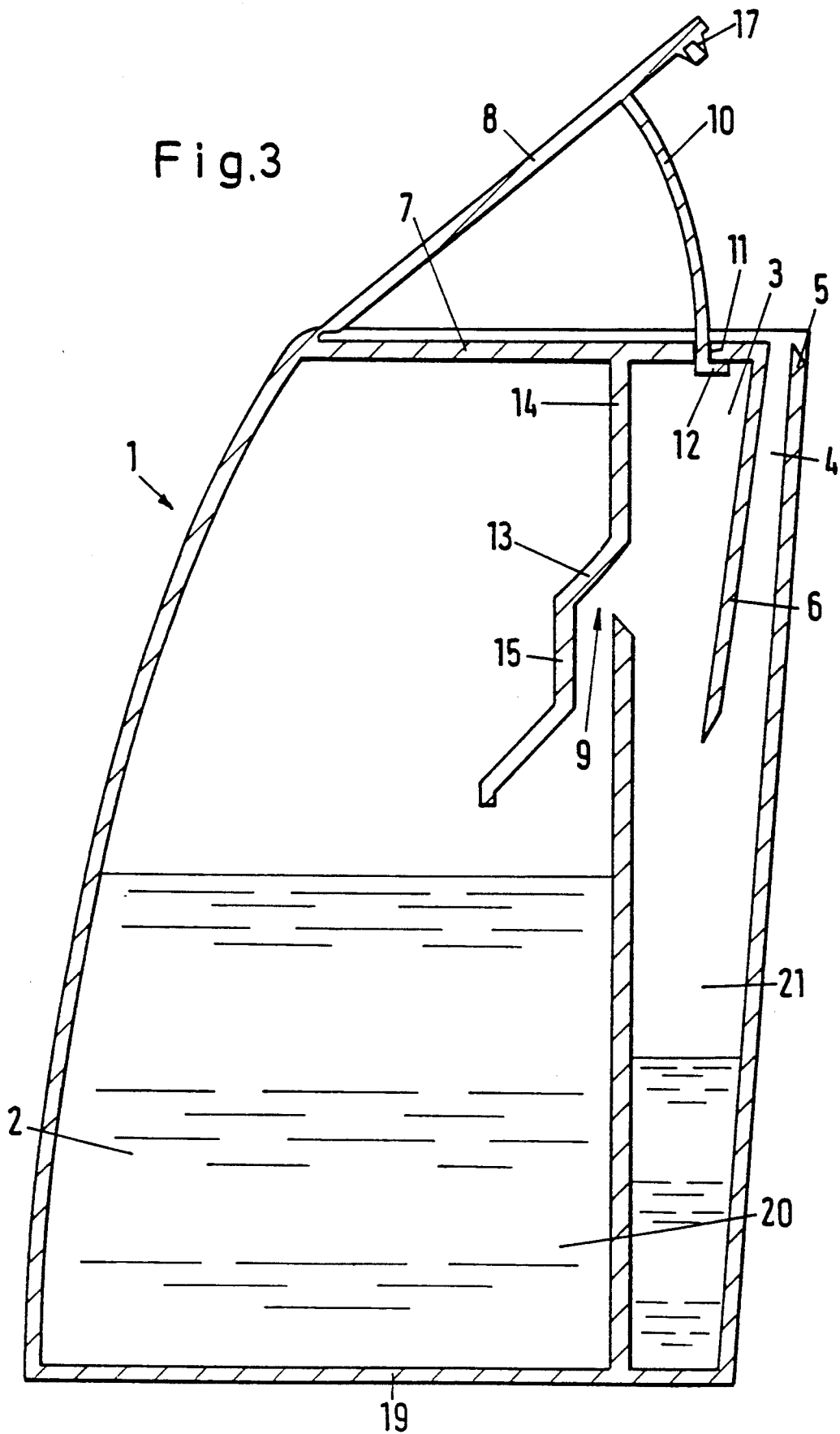
FIG. 3 depicts the dispenser of FIG. 1 in the open position.
Figure 4:
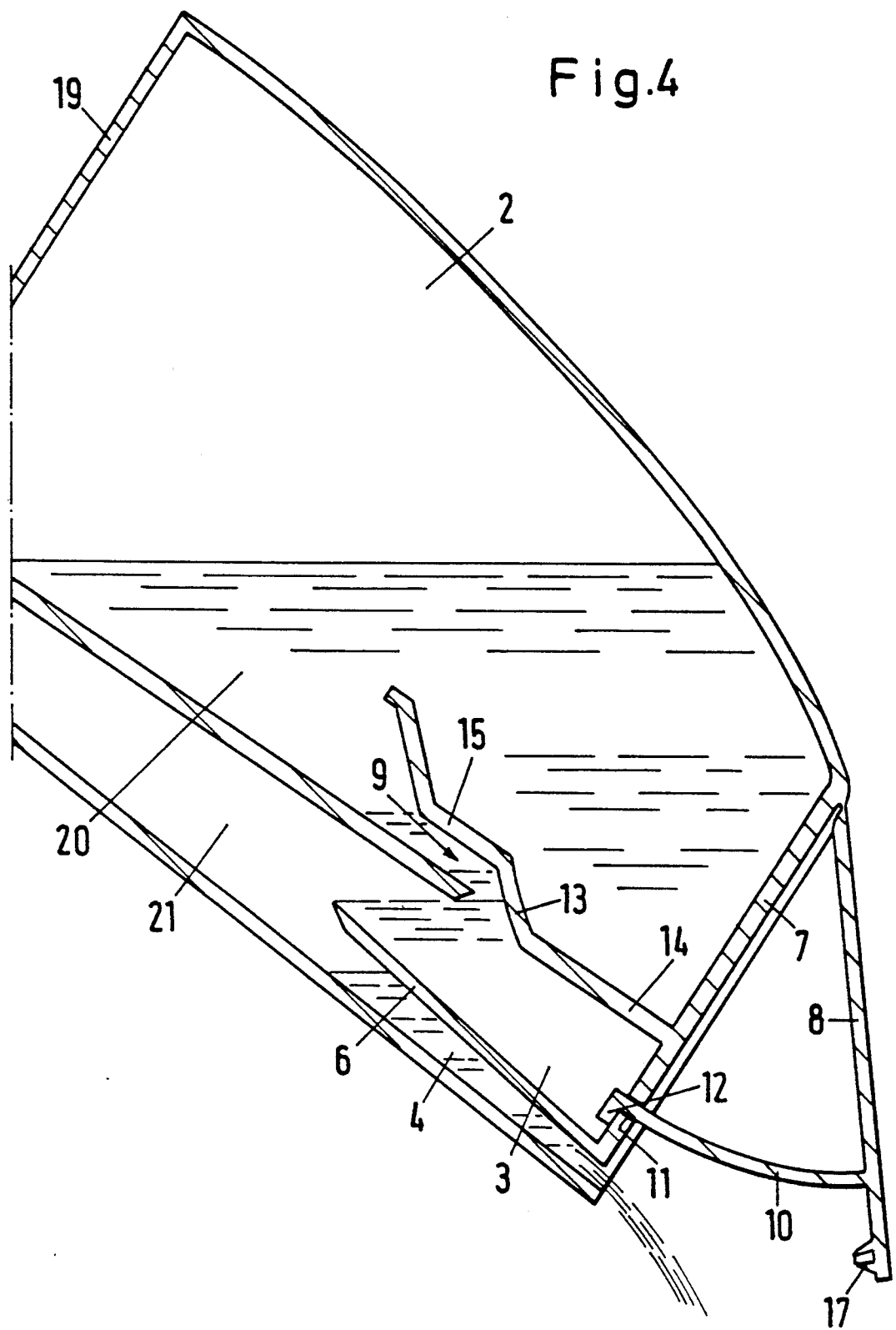
FIG. 4 depicts the dispenser of FIG. 1 in a discharge position.
Figure 11:
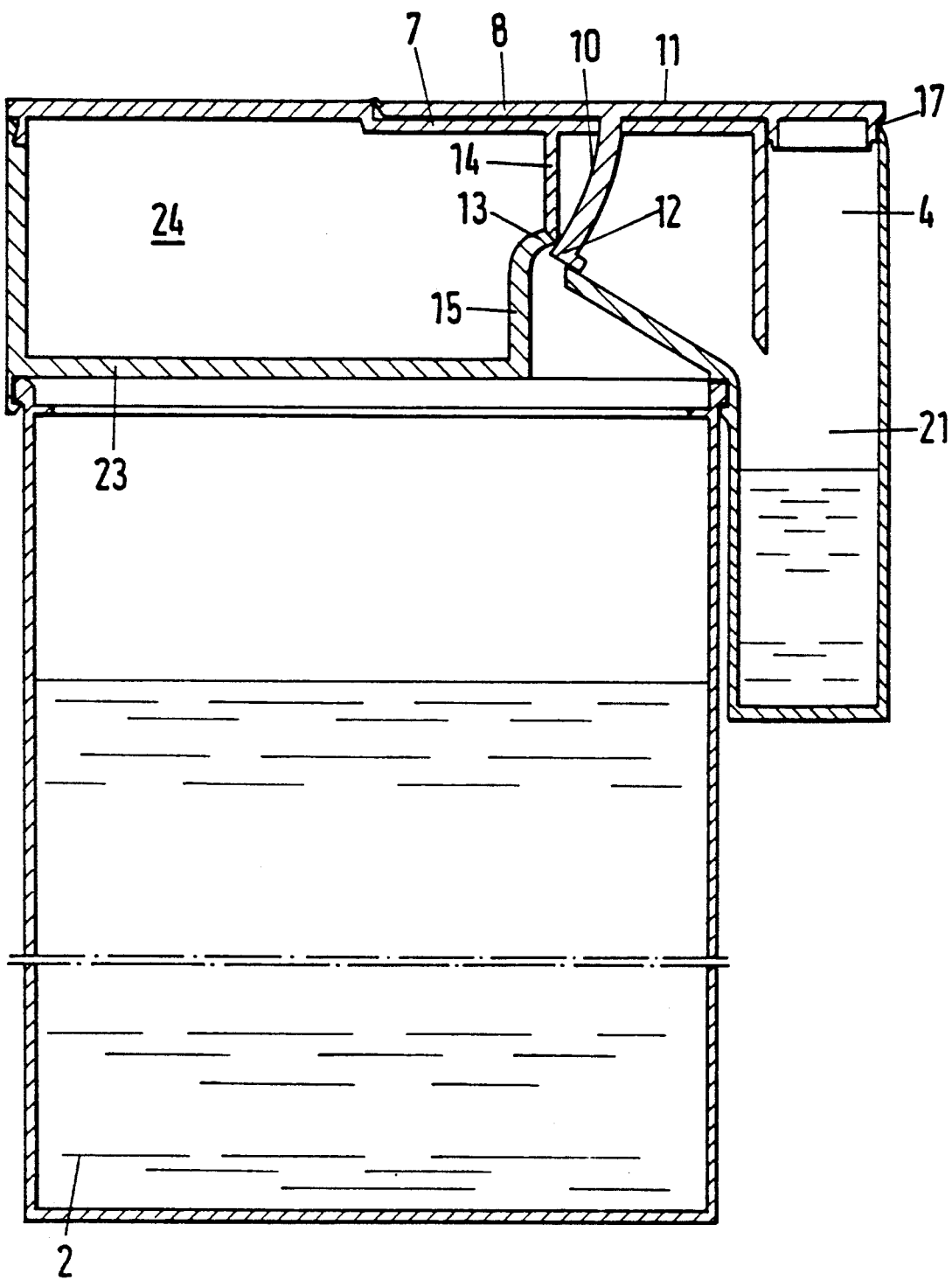
FIG. 11 depicts a dispenser in the closed position according to another embodiment.

With reference to FIGS. 1,5 and 11 will firstly be described a dispenser 1 for, in particular, pulverulent or granular materials, having a storage chamber 2, a portioning chamber 3 and a discharge chamber 4, the latter having a discharge opening 5 (cf. e.g. FIG. 3). The discharge chamber 4 is separated from the portioning chamber 3 by a partition 6, which is shaped onto a cover 7 of the dispenser 1.

The dispenser 1 also has a closure 8, which in the closed state closes discharge opening 5 opening 9 from the storage chamber 2 to the portioning chamber 3. On the cover-like closure 8 is constructed a blocking part 10, which is guided through an opening 11 in the cover 7 and rests in blocking manner on the through opening 9 from the portioning chamber 3. Engaging internally on the cover 7, the blocking part 10 moves from above, from an open position according to FIG. 3, during a closing movement of the closure 8, into the portioning chamber 3 until a blocking portion 12 rests in closing manner on the through opening. In certain embodiments the blocking part 10 is guided by a portion 13 of a dividing wall 14 or a guide wall 15. In the embodiment according to FIG. 1 the portion 13 is formed in the vicinity of the guide wall 15. It is immediately adjacent to the through opening 9 or extends up to the latter. Only roughly in the final quarter of its movement in the closed state is the blocking part 10 guided by the portion 13. The blocking part 10 has an arcuate shape in cross-section and the portion 13 is adapted shape-wise thereto. In the embodiment according to FIG. 5 the portion 13 is formed by the upper part of the dividing wall 14. The blocking part 10 is guided throughout its movement into the closed position by the portion 13. In the embodiment according to FIG. 5 the blocking part 10 is constructed with a blocking portion 12, which frontally constantly engages on the partition 6. In this embodiment both the partition 6 and the portion 13, together with the corresponding wall of the blocking part 10 are cross-sectionally arcuate. In the embodiment according to FIG. 5 the blocking part 10, in the closed state, engages over roughly three quarters of its length on the portion 13.

The opening 11 and flexibility of the blocking portion 12 can be selected in such a way that the portion 12 can be pressed through the opening 11, accompanied by the deformation thereof. Alternatively the closure 8 can be constructed as a separate part and then inserted from the side, as shown in FIGS. 5a,6a,7a and 8a. It is clear from a comparison of FIGS. 5 and 5a, etc., that on the hinge-side end there is in each case a projecting portion the underside of which engages the closure, said projecting portion acting as a hinge abutment.

Figure 7:
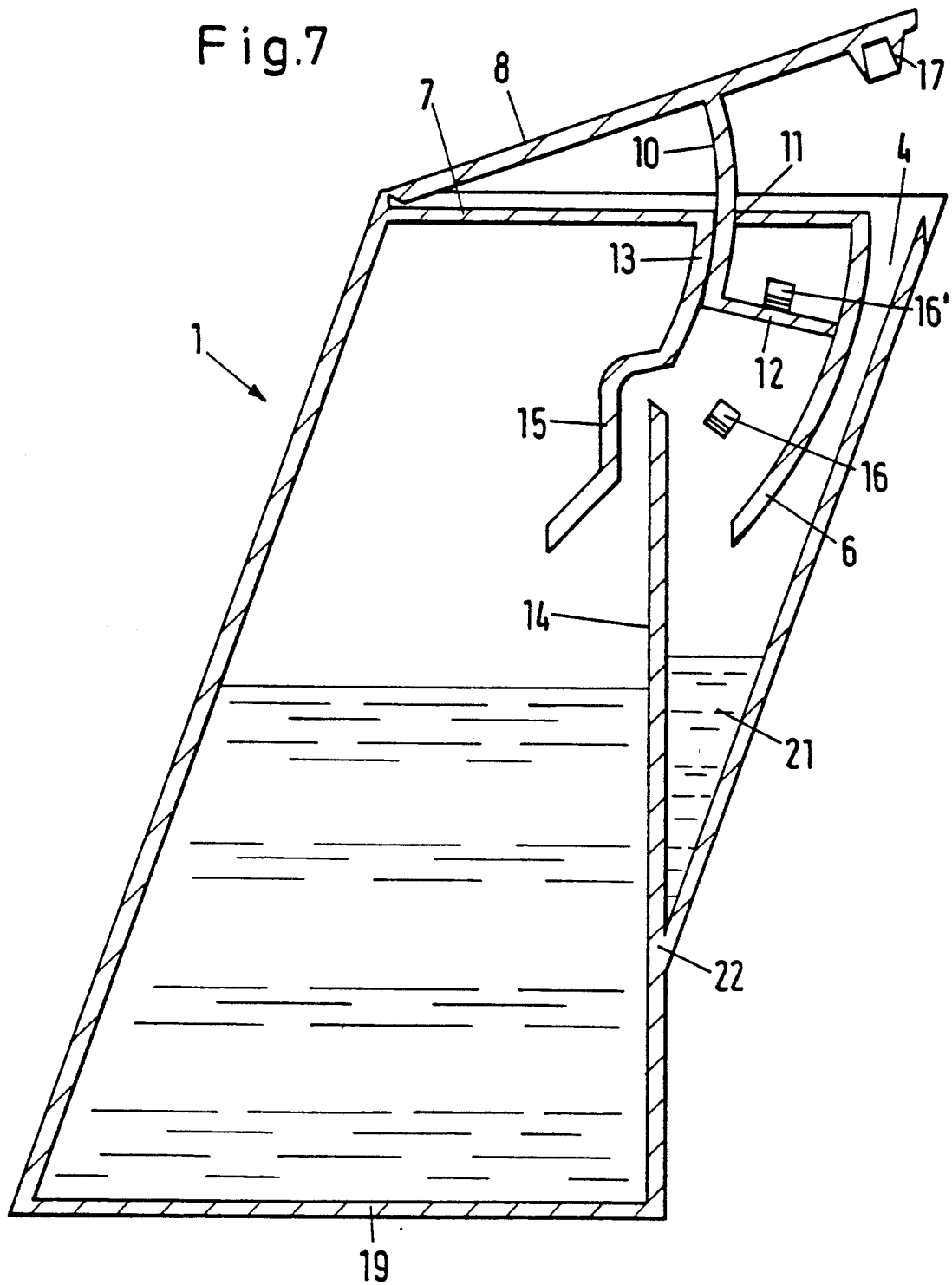
FIG. 7 depicts the dispenser of FIG. 5 in a first open position.

In the embodiment according to FIG. 11 the portion 13 is formed merely by a corner between the guide wall 15 and the dividing wall 14. In the closed state the blocking part 10 is only supported in punctiform manner by the portion 13. In the embodiment according to FIGS. 1 and 11 the blocking part 10 is arranged with a lateral spacing 'a' from the dividing wall 14, in the vicinity of the cover 7. In the embodiment according to FIG. 5 there are lateral (frontal) locking cams 16,17, which permit a clearly defined closed position and a clearly defined, first open position (FIG. 7).

As is preferred in all embodiments, and in the case of the embodiment according to FIG. 5, the closure 8 is constructed in one piece with the chambers or the walls forming the latter. Preferably the dispenser 1 is manufactured as a plastic injection moulding. The closure 8 is injection moulded in the open state, so that the closure 8 has a constant tendency to open. The clearly defined closed state is obtained by the locking cam 17 at the front end of the closure 8 for closing the discharge opening 5. After the cam 17 has been moved out of the opening 5, the closure 8 preferably passes into an open position, e.g. according to FIG. 3. In the embodiment according to FIG. 5, to open the closure 8, it is firstly necessary to pass over the lateral locking cam. As a result of the pretension in the open position resulting from manufacture, the closure 8, or more precisely the blocking portion 12 of the blocking part 10, runs against the locking cam 17. Only in the case of a further intentional opening of the closure 8 is there also a running over of the locking cam 17.

In the embodiments, particularly according to FIGS. 1 and 5, but also according to FIG. 11, a guide wall 15 opening against a pouring direction (cf. e.g. FIGS. 4,8,10 and 14) is constructed so as to project into the storage chamber 2 and which, leading to the passage or through opening 9, creates a funnel-shaped taper. The e.g. pulverulent material is guided through the guide wall 15 during a tilting over to the through opening 9.

In the embodiments according to FIGS. 1 and 5, the guide wall 15 only covers part of the storage chamber 2 (portion 'p' in FIG. 1) in the pouring direction in a projection on the cover surface 7 of said chamber. On tilting the dispenser 1, such as is, e.g., shown in FIG. 4, the entire material in the storage chamber 2 does not act on the material upstream of the through opening 9 held by the guide wall 15.

As can, e.g., be gathered from FIGS. 11 to 14, the dispenser 1 can also be constructed as an attachment for a storage container 18, the latter essentially forming the storage chamber 2.

In the embodiment according to FIG. 1 the portioning chamber 3 and the discharge chamber 4 are drawn downwards up to a base wall 19, which also defines the storage chamber 2. Emanating from the cover 7, the partition 6 projects freely (frontally) into the chambers passing into one another in the lower part, i.e. the portioning chamber 3 and the discharge chamber 4. As can be gathered from the plan view according to FIG. 2, the area forming the portioning chamber 3 and the discharge chamber 4 has an acute-angled shape. The closure 8 has an adapted shape. However, in elevation, the storage chamber 2 is substantially circular.

The function of a dispenser 1 will now be described relative to FIGS. 4,8,10 and 18 and based on FIGS. 3,7,9 and 13. After opening the closure 8, at the time of the initial use (FIG. 3 etc. showing the state after an initial use), the dispenser 1 is tilted over. Pulverulent material or the like 20 flows out of the storage chamber 2, i.e., through the through opening 9 into the portioning chamber 3. The dispenser 1 is then pivoted back into its normal position. The material 20 flows from the portioning chamber 3 into a collecting chamber 21, which is jointly used by the portioning chamber 3 and the discharge chamber 4. By a further tilting over the material 20 is discharged through the discharge opening 5. Only the material located in the collecting chamber 21 can pass out. The material which at the same time flows into the portioning chamber 3 is prevented from discharge without a further tilting by means of the partition 6.

Figure 9:
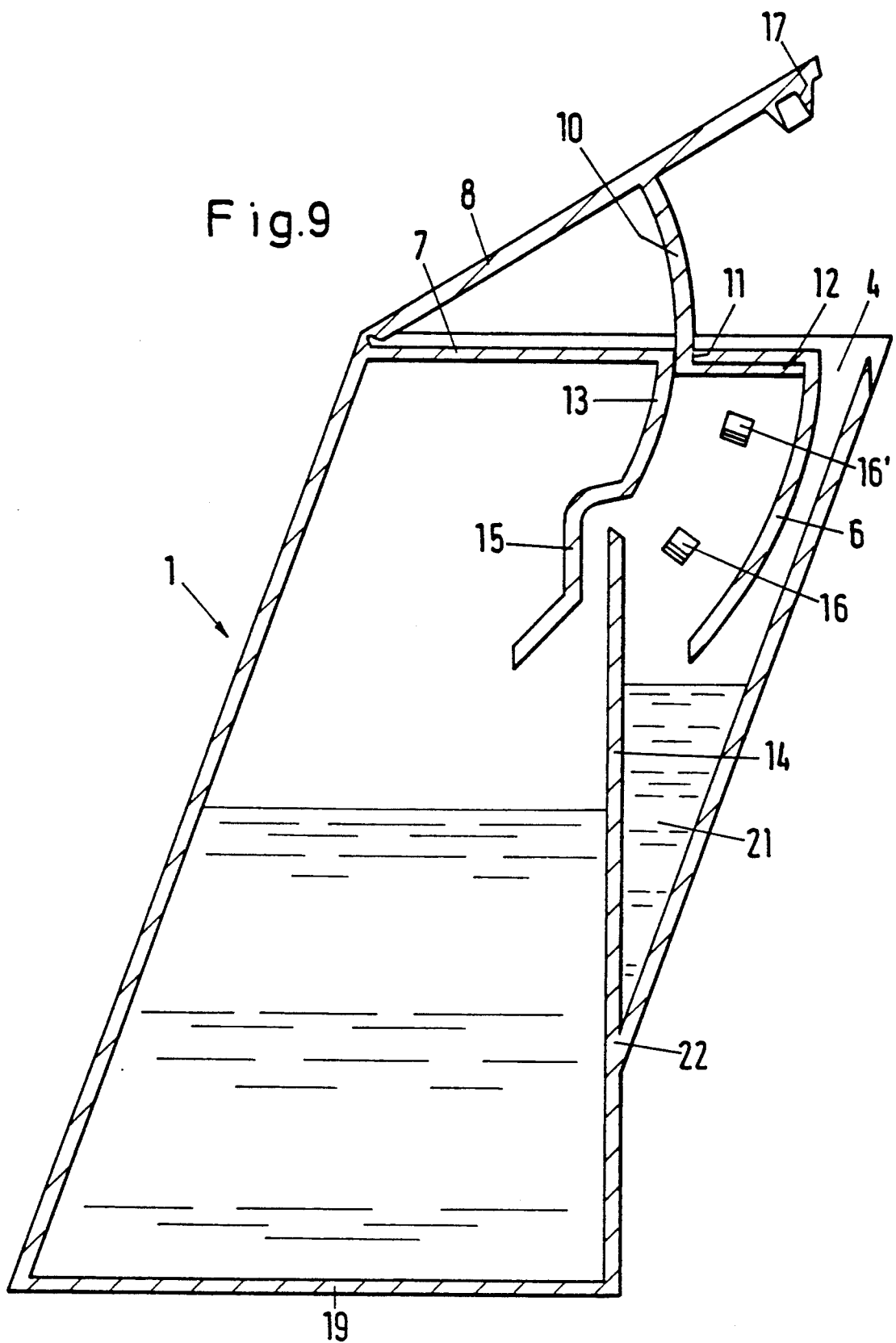
FIG. 9 depicts dispenser according to FIG. 5 in a second open position.

In the embodiment according to FIG. 5 the collecting chamber 21 does not continue up to the bottom surface 19 and instead ends above the same. As can be gathered from the plan view according to FIG. 6, this embodiment is particularly suitable for a projection of the portioning chamber 3 and the discharge chamber 4. In connection therewith FIGS. 8 and 9 show that independently of the full or partial open position of the closure 8, there is always an unhindered passage possibility through the through opening 9 and a discharge possibility through the discharge opening 5 for the particular material. The portioning can also be adjusted by the closure 8 displaceable against the cams 16,17.

Figure 12:
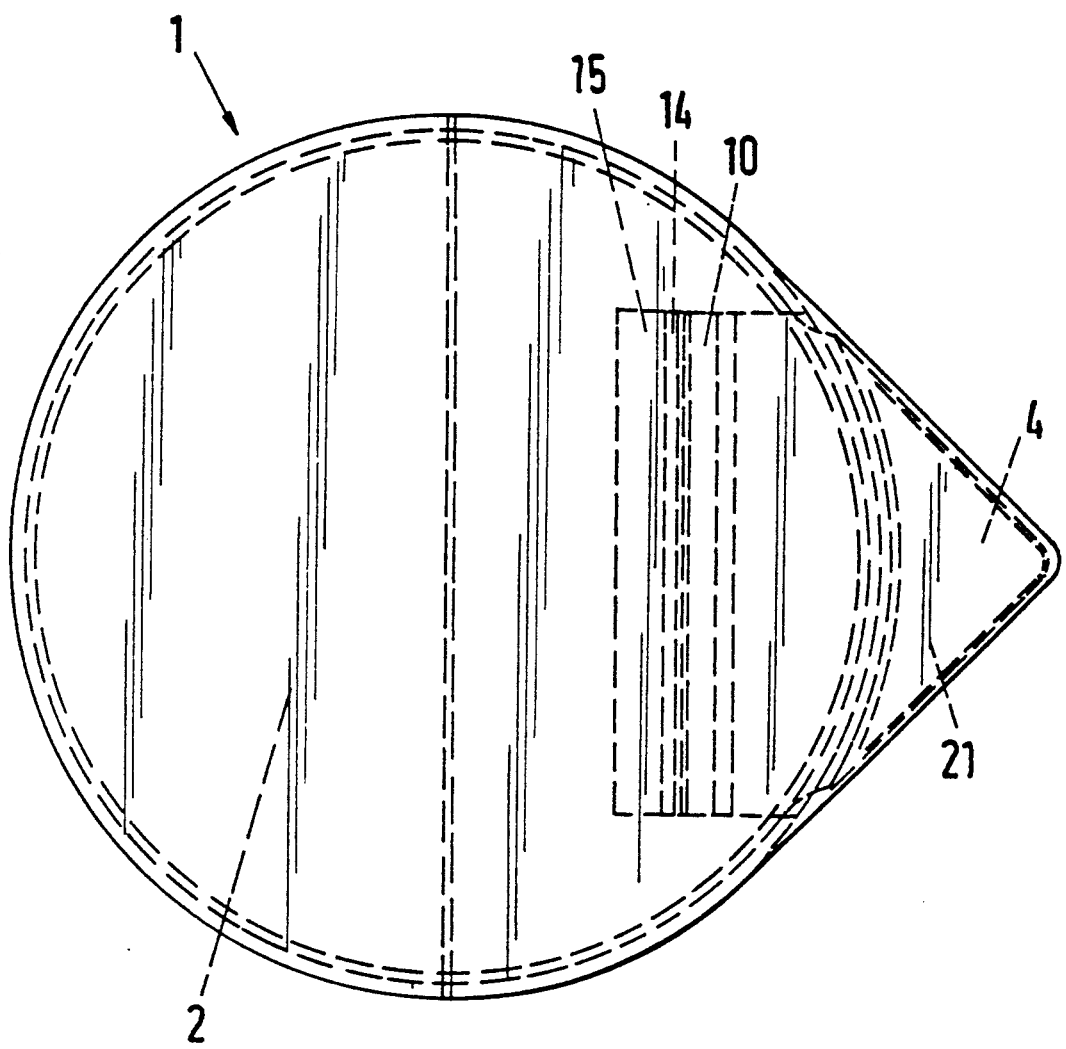
FIG. 12 depicts a plan view of the dispenser of FIG. 11.
Figure 13:
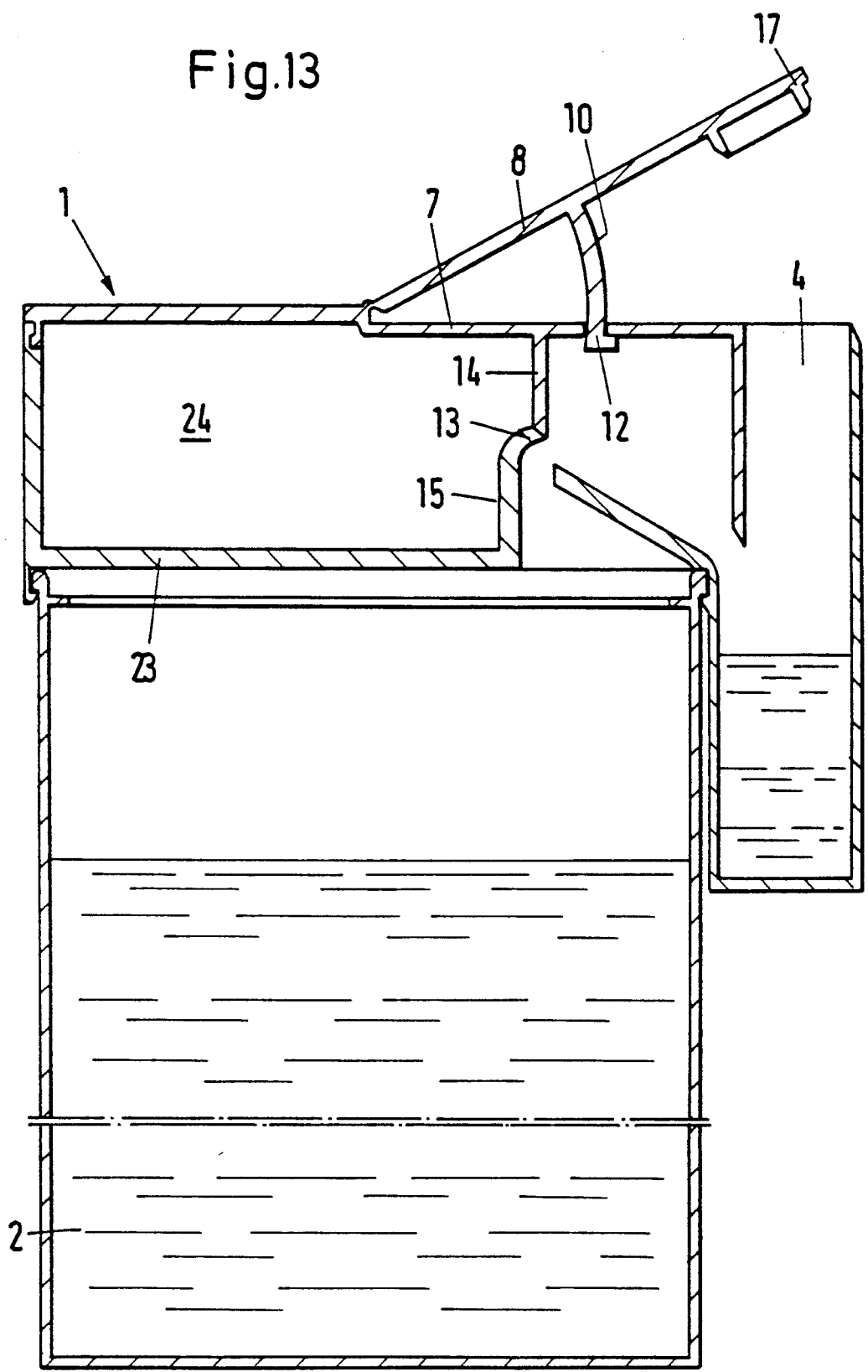
FIG. 13 depicts the dispenser of FIG. 11 in an open position.

In the embodiment according to FIG. 11 the guide wall 15 passes into a cover 23, so that above the latter there is an unused space 24. The dispenser 1 can be stepped in this area. The plan view of FIG. 12 shows that in this embodiment the storage chamber 2 and the upper part of the dispenser 1 associated with this area preferably have a circular cross-section, whereas the discharge chamber 4 together with the collecting chamber 21 form an acute-angled area.

Figure 2:
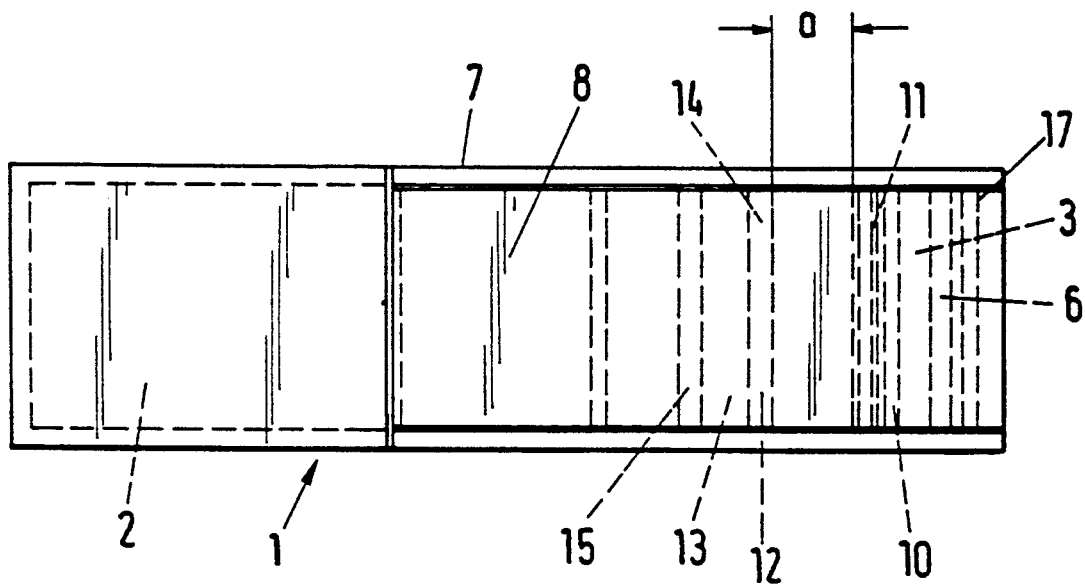
FIG. 2 depicts the dispenser of FIG. 1 in plan view.
Figure 6:
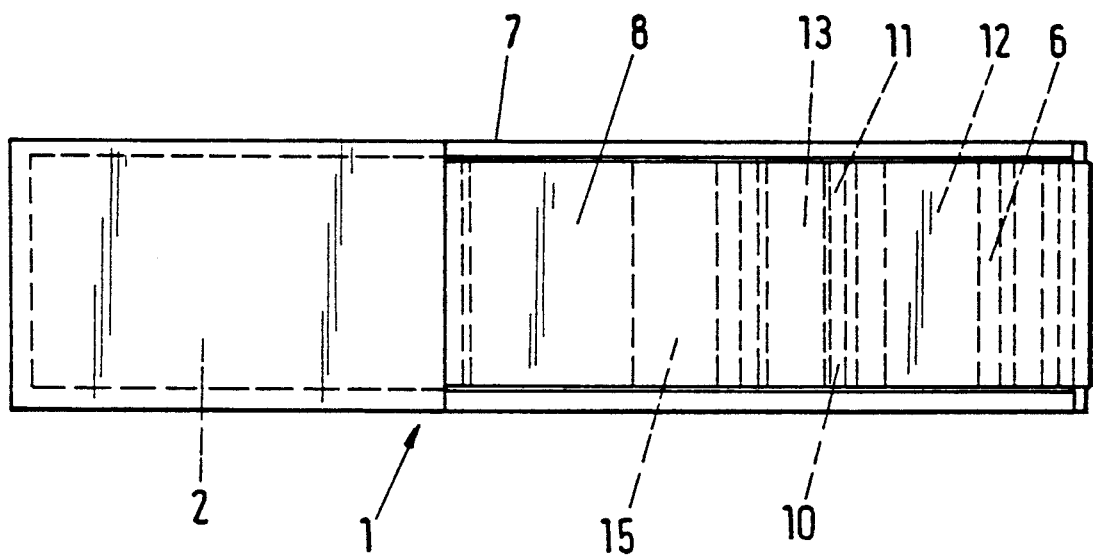
FIG. 6 depicts the dispenser according to FIG. 5 in plan view.
Figure 6A:
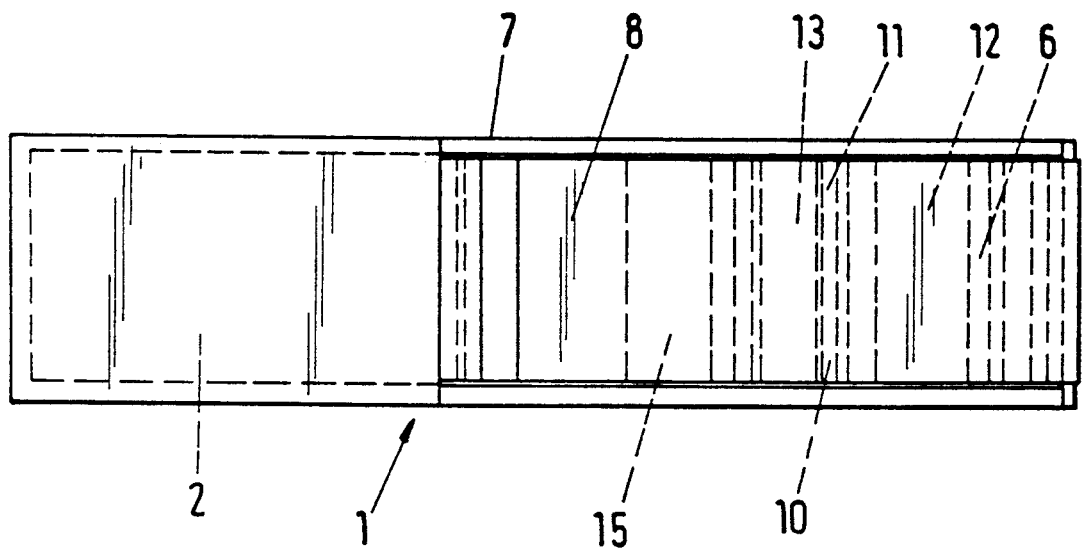
FIG. 6a depicts a representation according to FIG. 6, with a closure constructed as a separate part.
Figure 10:
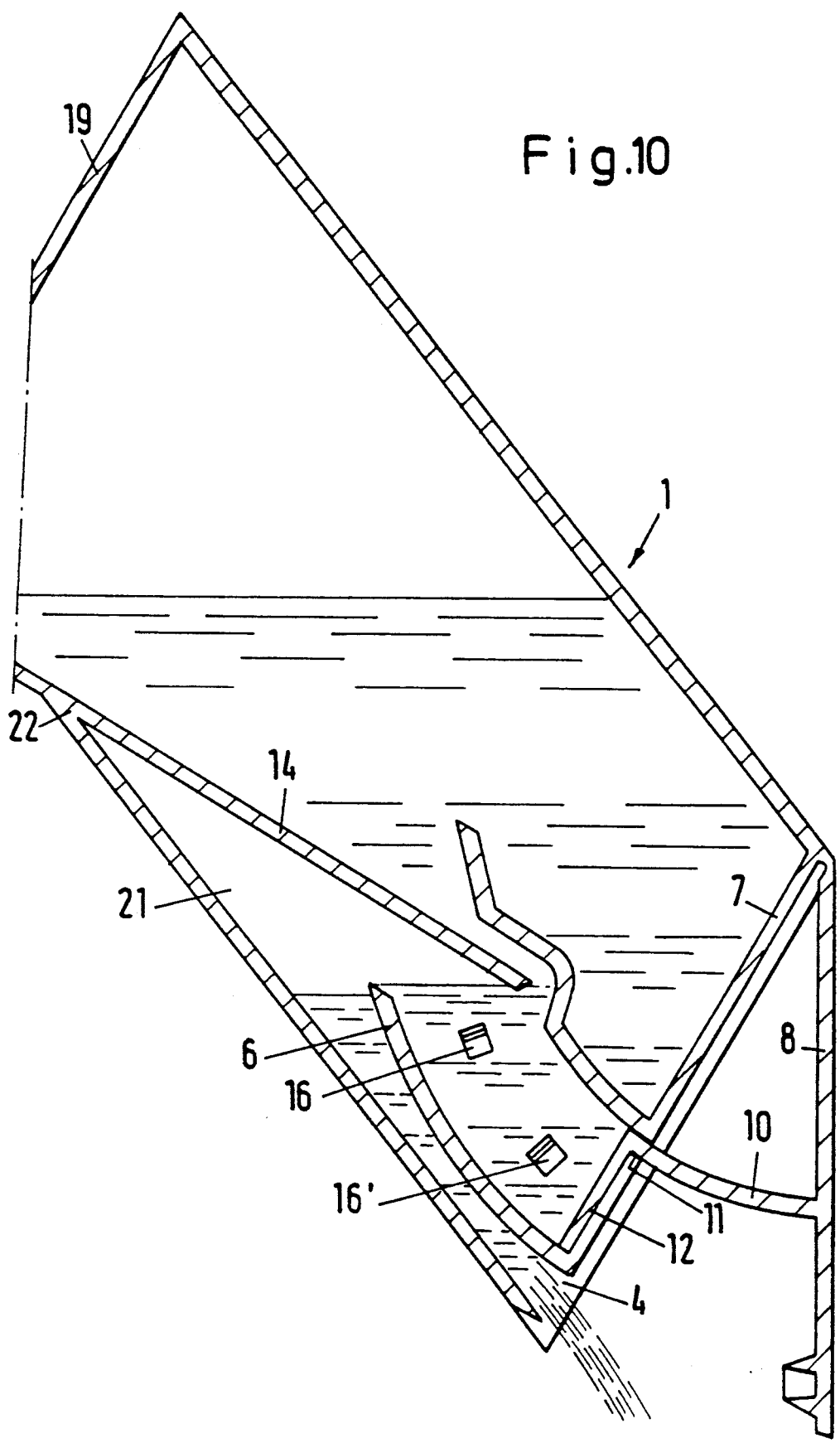
FIG. 10 depicts the dispenser according to FIG. 5, open, according to FIG. 9, in a discharge position.

FIGS. 2 and 6 show that the embodiments according to FIGS. 1 and 10 in plan view preferably have a rectangular cross-section. With respect to the embodiments of FIGS. 11 to 14, FIG. 12 shows that it has in plan view a substantially circular cross-section with an acute-angled attachment on one side.

The inventive features disclosed in the description, drawings and claims can be utilized in the realization of the invention, both individually and in random combination. Although the invention has been described in accordance with preferred embodiments, it will be seen by those skilled in the art that many modifications can be made within the spirit and scope of the present invention, and there is no intention to limit the scope of the present invention to any of these embodiments. Rather, the scope of the present invention is to be measured by the appended claims.

I claim:

1. A dispenser for pulverulent or granular materials comprising a storage chamber, a portioning chamber having a cover and a discharge chamber having a discharge opening, said discharge chamber being separated from the portioning chamber by a partition so that by a first tilting over, the material passes from the storage into the portioning chamber where the material is portioned, and from there, on tilting back, the portioned material passes into the discharge chamber, and on tilting over a second time, the portioned material is discharged, said dispenser further comprising a closure which, in the closed state, closes both a through opening from the storage chamber to the portioning chamber and the discharge opening, said partition having a fixed construction and said closure including a blocking part for blocking the through opening from the storage chamber to the portioning chamber in the closed state, whereby during a closing movement of the closure, the blocking part can be moved through an opening in said cover of the portioning chamber.

2. A dispenser for pulverulent or granular materials according to claim 1, further comprising a dividing wall between the storage chamber and the portioning chamber, said blocking part being guided by a portion of said dividing wall.

3. A dispenser for pulverulent or granular materials according to claim 2, said blocking part being laterally spaced from the dividing wall in the vicinity of the opening in the cover of the portioning chamber.

4. A dispenser for pulverulent or granular materials according to claim 1, wherein said blocking part, in the closed state, also closes an internal cross-section of the portioning chamber.

5. A dispenser for pulverulent or granular materials according to claim 1, wherein said blocking part can be displaced in locking manner.

6. A dispenser for pulverulent or granular materials according to claim 1, wherein said closure is constructed in one piece with said storage, portioning, and discharge chambers.

7. A dispenser for pulverulent or granular materials according to claim 1, wherein a guide wall opening counter to the pouring direction projects into the storage chamber and creates a funnel-shaped taper towards the through opening.

8. A dispenser for pulverulent or granular materials according to claim 7, wherein in the case of projecting in the pouring direction, the guide wall only covers a part of the cover of the storage chamber.

9. A dispenser for pulverulent or granular materials according to claim 1, wherein said dispenser is constructed as an attachment for a storage container.

10. A dispenser for pulverulent or granular materials according to claim 9, said storage chamber being formed by the storage container.

* * * * *